Figure 1:
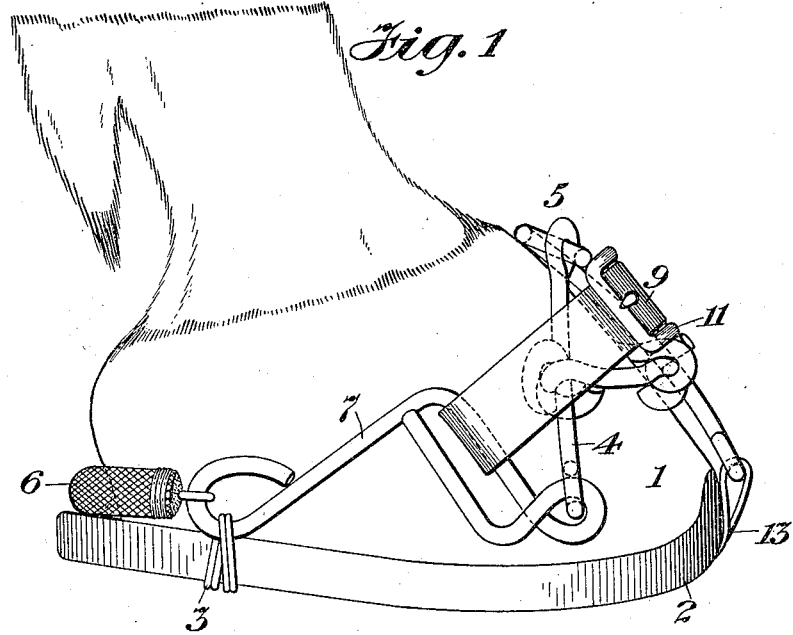

A. G. UPTEGRAFF.
ANTISLIPPING DEVICE FOR THE FOOT.
APPLICATION FILED MAR. 12, 1909.

1,046,509.

Patented Dec. 10, 1912.
5 SHEETS—SHEET 1.

Witnesses:
Chas. F. Clagett

Inventor
Alexander G. Uptegraff
By Attorney
George C. Allen

A. G. UPTEGRAFF.
ANTISLIPPING DEVICE FOR THE FOOT.
APPLICATION FILED MAR. 12, 1909.
1,046,509.
Patented Dec. 10, 1912.
5 SHEETS—SHEET 2.
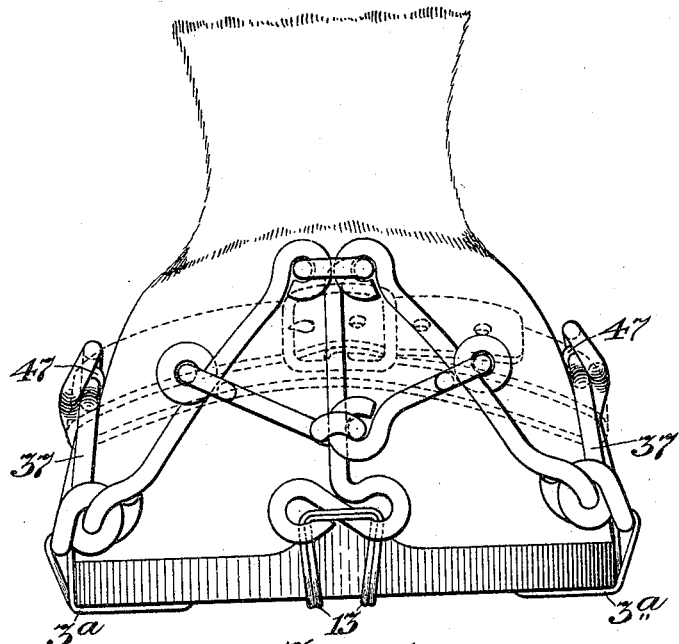
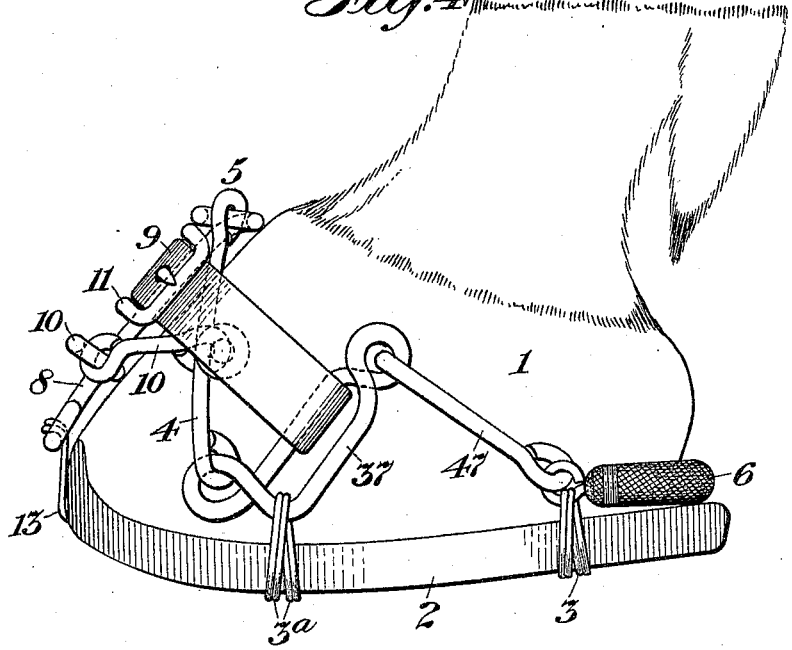
Witnesses:
Inventor
Alexander G. Uptegraff
By Attorney A. G. UPTEGRAFF.
ANTISLIPPING DEVICE FOR THE FOOT.
APPLICATION FILED MAR. 12, 1909.
1,046,509.
Patented Dec. 10, 1912.
5 SHEETS—SHEET 3.
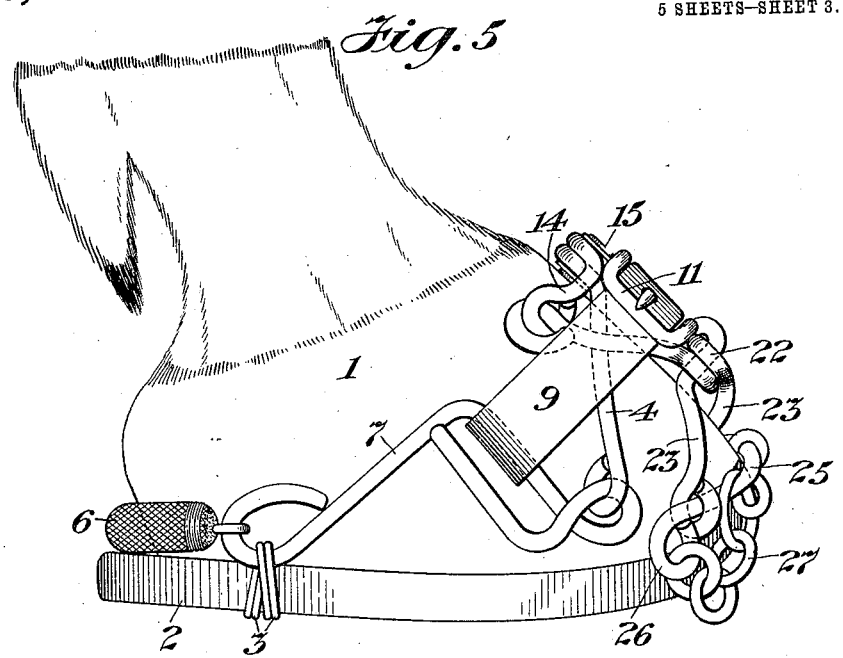
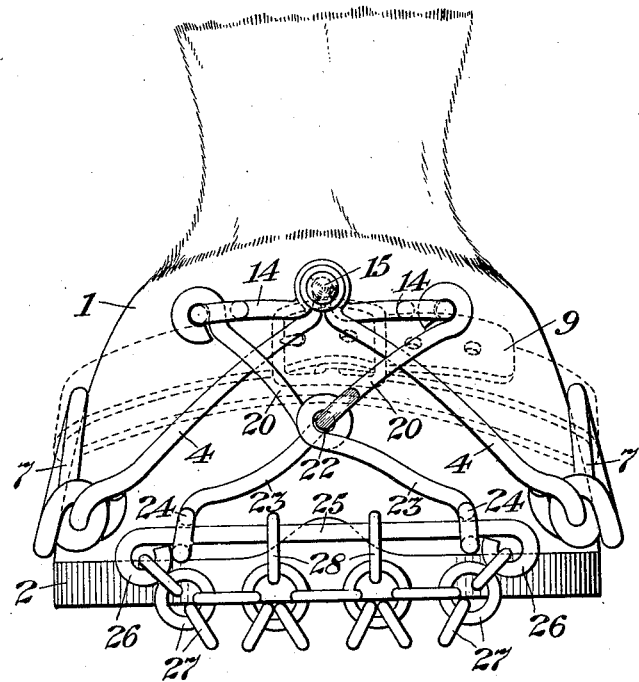
Witnesses:
Inventor
Alexander G. Uptegraff
By Attorney

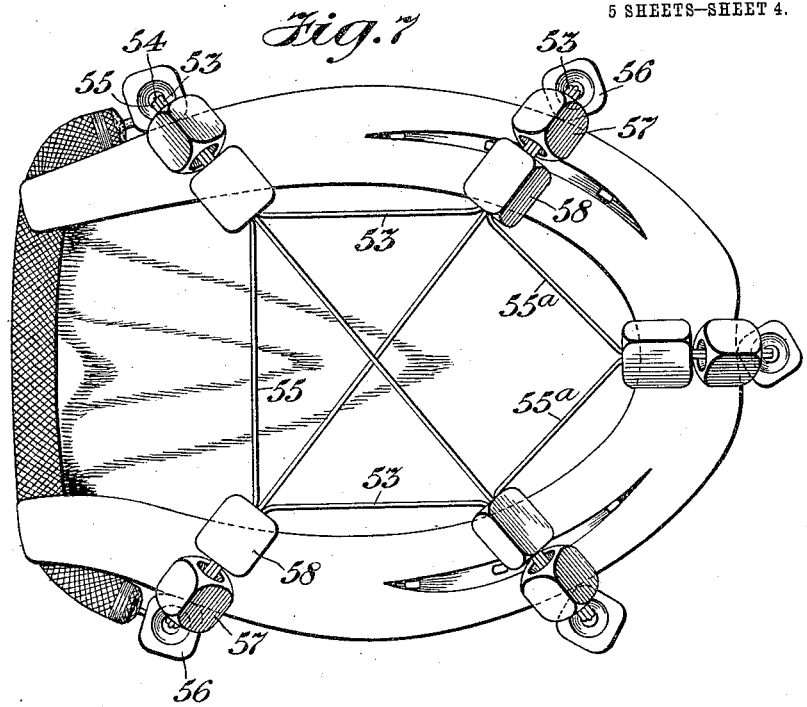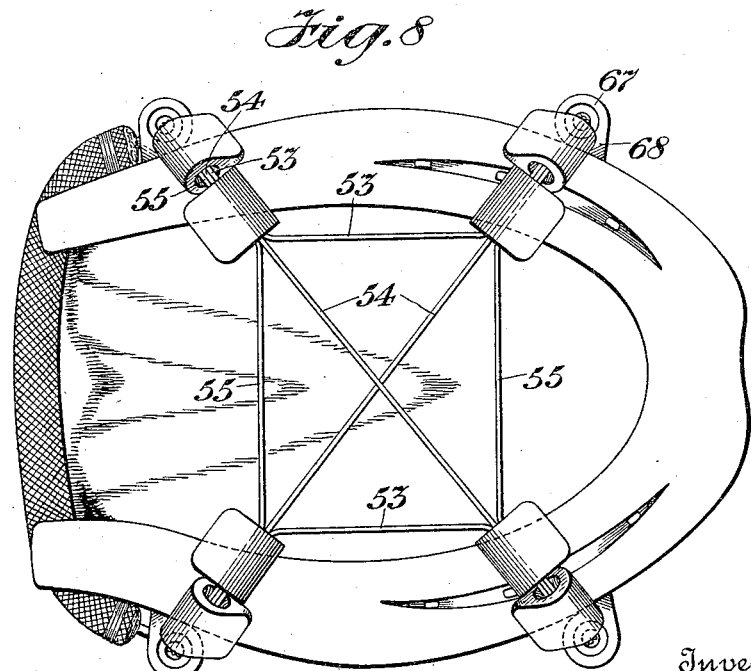

A. G. UPTEGRAFF.
ANTISLIPPING DEVICE FOR THE FOOT.
APPLICATION FILED MAR. 12, 1909.
1,046,509.
Patented Dec. 10, 1912.
5 SHEETS—SHEET 5.
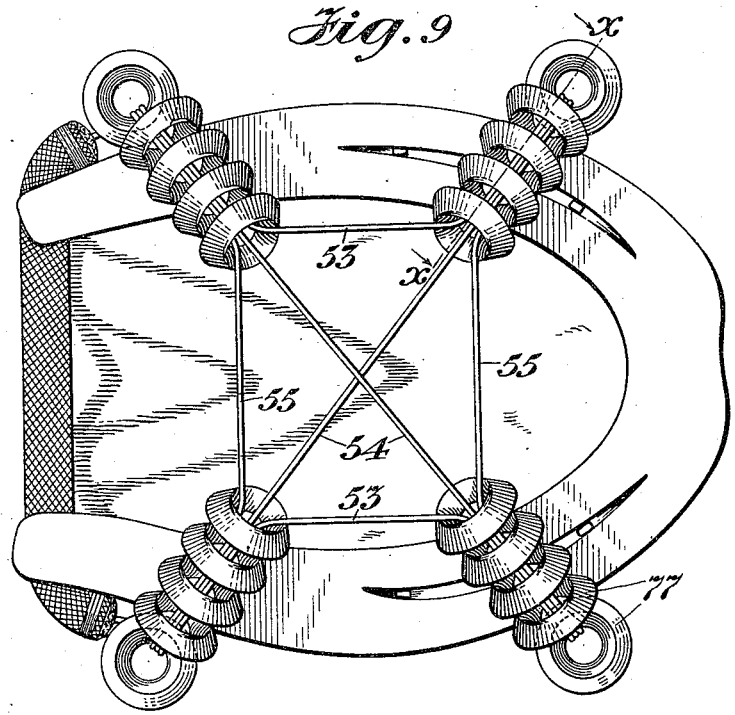
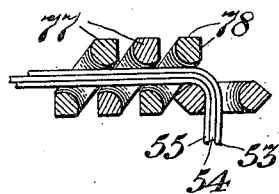

UNITED STATES PATENT OFFICE.

ALEXANDER G. UPTEGRAFF, OF LENOX, MASSACHUSETTS.

ANTISLIPPING DEVICE FOR THE FOOT.

1,046,509. Specification of Letters Patent. Patented Dec. 10, 1912.

Application filed March 12, 1909. Serial No. 482,893.

*To all whom it may concern:*

Be it known that I, ALEXANDER G. UPTE-GRAFF, a citizen of the United States, and a resident of Lenox, in the county of Berkshire and State of Massachusetts, have invented certain new and useful Improvements Relating to Antislipping Devices for the Foot, of which the following is a specification.

My present invention concerns devices adapted to be applied beneath the foot to prevent slipping. Certain features are adapted for use in connection with any foot, provided with a relatively firm tread portion adapted to engage the ground, whether artificially provided, as in the case of the ordinary boot or shoe on the human foot, or naturally provided, as in the case of hoofed animals, with or without the ordinary protecting shoe, of which the horse shoe is a well known type.

The invention includes securing means for securing any tread to a foot, and particularly for securing flexible or yielding treads of the types invented by George N. Kinnell, as, for instance, those wherein the tread comprises movably associated members sufficiently rigid and of suitable shape to serve the purpose of spurs or calks movably held beneath the foot. The quality of relative movability may be due to the provision of joints whereby the structure is articulated or to the elasticity and disposition of the material.

My securing means for the tread may and preferably does include certain of the features and advantages of the securing means shown in the patent of George N. Kinnell, No. 1,010,380. In said patent he has shown an overshoe consisting of interconnected diagonal strands or articulations adapted to serve as calks and suspended by a spreader and equalizing lever on each side of the foot, subject to upward and forward tension applied by means of a toe-strap and subject to rearward tension through a heel member seated in the notches under the heels of the hoof and above the rearwardly projecting ends of the metallic shoe. His heel member may be of fine quality steel wire or chain, but is preferably of heavy baling wire which does not stretch and is not very resilient, yet is flexible enough so that in use it fits itself to the surface upon which it bears and becomes bent or set so that there is practically no tendency for it to spring out of position. Various other novel features and functions of said overshoes are explained in said patent.

One object of my invention is to provide a securing means consisting mainly of more or less rigid members jointed in such manner as to afford the necessary upward tension upon the tread portions at the desired points, and which shall be sufficiently flexible so that a given device will be applicable to hoofs of varying size and shape.

Another object of my invention is to provide a securing means wherein the parts are so organized that the device will be self-adjusting when applied to hoofs of various shapes and sizes and will normally maintain an upward tension at the point of the toe notwithstanding very considerable relative movement or displacement of the connecting parts at other points around the periphery of the hoof. By insuring a definite, relatively stable holding means at the toe, I am able to provide a three point, non-slip contact with the ground, the other two points of contact being on opposite sides of the hoof between the toe and heel, preferably quite close to the heels.

A further object of my invention is to provide a suitable yielding tread wherein the structure is sufficiently rigid to serve as satisfactory calks supported in a sufficiently movable, flexible or yielding manner and yet not composed of separate links. To this end the tread portion may consist of fine quality steel wire, such as piano wire, which will afford a satisfactory tread, if a sufficient number of strands is used or if the strands are of sufficient diameter. Sizes from $\frac{1}{32}$ inch, or less, up to $\frac{1}{16}$ inch, or more, may be used as flexible strands, and much heavier thicknesses of metal may be used where the metal is bent upon itself, after the manner of a spring, so as to afford sufficient elasticity to permit of a desired flexibility of the strands.

My new flexible tread element constitutes a separate improvement capable of being assembled in any desired relation. For instance, such flexible tread element may be disposed in a single strand diametrically across the hoof, or as three or four intersecting strands employed either with or without a central link spanning or extending around the frog of the hoof.

Having thus described the nature and object of my invention, I will now proceed to describe specific embodiments thereof in connection with the accompanying drawings, in which—

Figure 2:
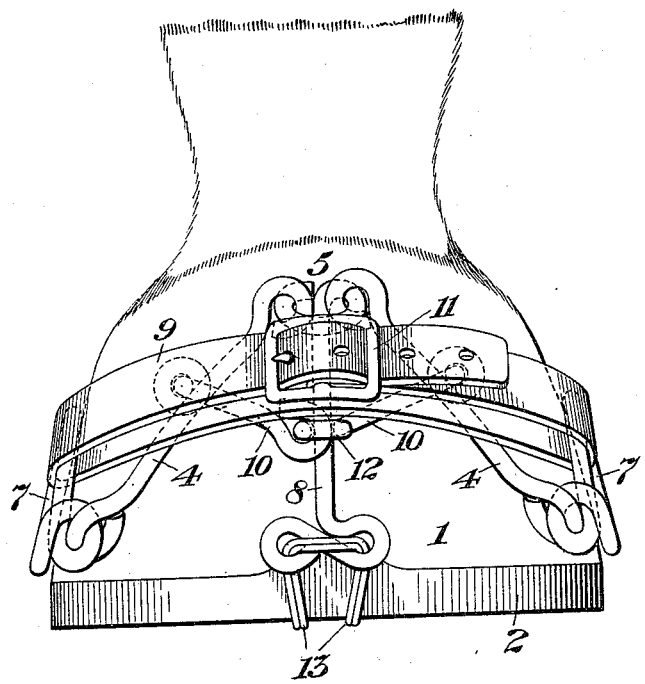

Figures 1 and 2 are respectively side and front elevations showing my improved securing means and the relation thereto of the strands which extend therefrom beneath the tread of the hoof. Figs. 3, 4 and 5, 6 are similar views showing certain modifications. Figs. 7, 8 and 9 are plan views of the hoof tread showing various arrangements of strands applied thereto. Fig. 10 is a detail section on the line X—X, Fig. 9.

In the form shown in Figs. 1 and 2, the hoof 1 is shod with an ordinary metallic shoe 2. The means for securing the tread to the hoof is shown as including certain elements forming part of an invention covered by patent of George N. Kinnell, No. 1,010,380, issued November 28th, 1911. Said parts comprise a heel member 6, extending across the heels of the hoof and engaging the angle or notch formed beneath the heels and above the upper surface of the rearwardly projecting ends of the horse shoe. On each side of the hoof the heel member is connected to a V or L shaped member 7, preferably disposed with the angle uppermost and the open side approximately parallel with the tread. Extending over the toe of the hoof between these members is an adjustable toe strap 9, adapted to be tightened by buckle 11. Associated with this construction, I arrange at the lower foremost points of the two members 7, 7, forwardly and upwardly converging members 4, 4, which are jointed on the medial line of the toe, either directly or by an intermediate member, as at 5. By this arrangement, the members 4, 4, are permitted to approach or recede around the wall of the hoof by shortening or lengthening strap 9, and this characteristic relation is t disturbed when the device is applied to hoofs of considerable different pitch or larger or smaller size. It is to be noted that tightening of the toe strap 9 causes the central joint at 5 to move up the toe, and one feature of my invention consists in utilizing this upward movement to produce a tension on the toe strand. This may be accomplished in various ways, as by arranging a third member 8 depending from the pivotal joint 5. This member 8 may be prevented from lateral displacement by a pair of downwardly converging toggle members 10, 10, pivoted to 4, 4, intermediate their ends and to each other on the medial line of the hoof, the joint at the latter point encircling or otherwise engaging the lower end of the depending member 8, as at 12, thereby maintaining the lower end of the latter against any lateral displacement. With this arrangement, the members 7, 7, and the upwardly converging members 4, 4, jointed thereto, may be moved to and from each other without displacing the lower end of 8 from the medial line. Moreover, it will be noted that the lower end of 8, where the toe strand is attached, is, mechanically considered, a natural center of displacement, so that if one member 7 is displaced upwardly and the other downwardly, the said point of attachment remains practically stationary. Tightening of the toe strap 9 causes movement directly up the face of the hoof, thereby tightening the toe strand 13, without material displacement thereof. The toe strand thus located and secured in place may be used in conjunction with heel tread strands extending downwardly and forwardly from the rear ends of members 7, 7, and, if desired, additional members 3ª extending downwardly and inwardly may be connected to the forward ends of members 7, 7, thus making a five point contact tread, as shown in front elevation in Fig. 3. It will be obvious that in said Fig. 3, and also in Fig. 4, the toe tread strand securing means is substantially the same as that shown in Figs. 1 and 2, but in Figs. 3 and 4, I have shown a modification wherein the rigid L shaped link is replaced by jointed members 37, 47, the normal angular relations of which are somewhat similar to those of the rigid arms constituting the link 7, as first above described. In the present case, however, the jointed connection causes the toe strap, which engages 37, to apply upward and forward tension on the heel member 6 and rear tread strand 3 through the diagonal member 47 and upward and forward thrust on each member 4 connected at the lower end of said member 37.

In Figs. 5 and 6, the construction of heel member 6, L-shaped link 7, rear tread strand 3, toe strap 9, buckle 11, and links 4, connected to the lower end of 7, is substantially the same as shown in Figs. 1 and 2, though it is obvious that the link 7 may be jointed as at 37, 47, as in Figs. 3 and 4 and a forward tread strand 3ª may be supplied, if desired. The means for causing tightening of the toe strap to apply a lifting effort upon the flexible tread connection at the toe is modified, however. By reference to the drawings, it will be seen that the members 4, 4, are jointed as at 15. This joint may be formed by interlinking of the material or by engagement with a common pivotal bolt or rivet, as shown in said Figs. 5 and 6. In this modification, the members 4, 4, are extended beyond the pivotal point so as to afford lever extensions 14, 14, to which are jointed downwardly converging links 20, 20, jointed to each other as at 22. By reference to Fig. 6, it will be seen that when the members 7, 7, are drawn toward each other by tightening of the toe strap 9, the point 15 is carried up the medial line of the extreme front of the hoof, as in Figs. 1 to 4 inclusive. In Figs. 5 and 6, however, the operation of the integral extensions 14, 14, is to apply an additional lifting movement upon the members 20, 20, by reason of the fact that the outer ends of said members 14, 14, are moved up relatively to the point 15, in addition to their bodily movement with 15. Thus, tightening of the toe strap causes an amplified lifting effect at the point 22, and the movement of the latter point may be utilized in any desired manner for affording a lifting effect on the toe strand. In the form shown, the members 20, 20, are extended at 23, 23, beyond the point of interlinkage at 22, and are utilized to afford separated supporting points on each side of the extreme toe. The toe chains may be attached directly to loops 24, 24, but I prefer to use a combined traveler and spreader 25, having a section of chain fabric, 27, suspended therefrom by eyes 26, and the intermediate links 28. In the particular position of the parts shown in Fig. 6, the toe strap 9 is presumed to have been tightened to the full extent, and it will be understood that in the loosened position, the extensions 14, 14, are more nearly parallel with 4, 4, and that the sliding loops or eyes 24 will be moved somewhat nearer the center of 25. It will be obvious that, in practice, considerable variation in the relative proportions of parts is possible and that the extensions 14, 14, may be either above or below the position shown when the toe strap has been fully tightened; also the loops 24, 24, may have a normal range of play nearer the center of member 25. Also, in certain cases, the parts 23, 23, may be rigidly connected to each other and flexibly connected to 20, 20, so as to serve as a rigid yoke for supporting two toe tread strands at points at each side of the tip of the toe.

In the remaining figures, I have shown various tread strands suitable for my purpose and adapted to be supported by the securing means shown herein or by any other desired securing means.

In Figs. 7, 8, 9, and 10, the tread and strands comprise lengths of wire, which may be extended directly across the tread or may be secured to a common central link of the form shown in the above mentioned patent of George N. Kinnell or of any other desired form, as, for instance, those shown in divisional application Serial No. 511,073, filed August 3, 1909. In Figs. 1, 2, 5 and 6 hereof, however, I have shown the tread strands as being three in number and disposed in such manner as to afford diagonal tension across the tread and also transverse and longitudinal tension in directions suitable for spacing apart the tread strands. In Figs. 7, 8, 9, and 10, the wires are masked and protected by metallic rings or beads, which are preferably formed of such shape as to minimize a possible tendency to roll and are of such material and proportions as to resist the crushing strains to which they are subjected in use. A series of these bodies extend from the side of the hoof across the tread of the horseshoe and serve as relatively movable calks and as a protection for the tension members or wires by which they are held in place. It will be understood that the wires are of fine quality material and are preferably of such diameter as to be capable of serving as calks, as, for instance, $\frac{1}{16}$ inch piano wire. Hence, if the encircling bodies are displaced so as to expose the wire, as, for instance, at the edge of the horseshoe, no harm will be done, because heavy piano wire is abundantly able to withstand the exposure to which it may be subjected by occasional and even frequent displacement of the protecting calks. In Figs. 7 and 8, each of the side strands consists of three parallel wires 53, 54, 55, encircled by perforated bodies 56, 57, and 58. The perforations in the latter are preferably circular in cross-section and in longitudinal section are of increasing diameter from the central portion toward each end. This longitudinal curvature of the walls of the perforation is such that when the strands between adjacent calks, as 56, 57, Fig. 7, are bent at right angles, the strands will not come in contact with any sharp edges. For this reason, the longitudinal curvature of the perforation at each end is preferably a quadrant of a circle of as large diameter as may be permitted by the thickness of the wall of the calk. The calks are preferably not true cylinders, and may be polygonal somewhat as shown in Fig. 7, where they have the general form of dice with rounded corners or they may be eccentric, as indicated in Fig. 8. In said figure, the end elevation of the calk is plainly evident at the upper right hand corner, where the calk is formed with a circular portion 67, having an angular projection 68. As shown, this projection has the geometric form and relation of one corner of an equilateral triangle having its center lying at the center of the circle 67. It will be obvious that a plurality of projections 68 may be used, as by making the cross-section of 67 an equilateral triangle with three complete points. In Fig. 8 the tension member or wire 53 extends from the side of the hoof at the rear through a suitable number of perforated calks, thence forward along the tread, and then outward through the forward tread calks on the same side of the hoof. The wire 54 extends diagonally across the tread through the calks forming the forward tread strands on the other side of the hoof, while the third wire 55 extends directly across the frog through the calks forming the rear strands on the other side of the hoof. By this means, the wires 54, 54, afford diagonal tension across the tread, the wires 53, 53, apply longitudinal tension and wires 55, 55, afford transverse tension. With this arrangement, tension on the various strands tends to maintain the perforated calks or beads in the outermost position toward the periphery. In Fig. 7, where a toe strand is used in addition to the forward and rear side strands, the forward wires 55ᵃ of the forward side strands converge diagonally forward to a central point where they are encircled by the forward beads or calks, thereby affording a flexible tension connection of a toe strand. In Figs. 9 and 10, the arrangement of wires is substantially the same as in Fig. 8, but the calks 77, are circular in exterior contour, tendency to roll being prevented by making them V-shaped exteriorly, as at 78, so that when pressure is applied the necessarily flatten down in non-rolling relation, as indicated in Fig. 10.

In Figs. 7 to 10, I have shown how very light material may be used for the tread tension members by protecting such material with rigid bodies where they cross the tread of the horseshoe, and in my divisional application Serial No. 511,073 above referred to I have shown how very heavy material may be used by flexing long lengths thereof to form a relatively short tread strand, thereby providing greatly increased flexibility and yielding quality for the heavy material. It will be understood, however, that wide variations in the dimensions and materials may be made in the constructions of all of said figures without departing from my invention.

The specific forms of tread shown in Figs. 8 to 10 inclusive are not claimed herein but in divisional application Serial No. 511,074.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. In a device of the class described, means for securing a tread portion to the foot, said means comprising a member for affording rearward tension about the heel, spreaders on each side of the foot, and central, pivoted thrust links adapted to afford upward tension at the toe when the remote ends thereof are moved toward each other, together with means for causing such movement of said remote ends.

2. In a device of the class described, means for securing a tread portion to the foot, said means comprising a member for affording rearward tension about the heel, spreaders on each side of the foot, and central, pivoted thrust links adapted to afford upward tension at the toe when the remote ends thereof are moved toward each other, in combination with means for causing such movement of said remote ends and toe strand supporting means adapted and arranged to maintain a medial position adjacent the foremost margin of the toe during such movement.

3. In a device of the class described, means for securing a tread portion to the foot, said means comprising a member for affording rearward tension about the heel, spreaders on each side of the foot, and central, pivoted thrust links adapted to afford upward tension at the toe when the remote ends thereof are moved toward each other, in combination with means for causing such movement of said remote ends and toe strand supporting means and toggle links for movably maintaining the same in a medial position adjacent the foremost margin of the toe.

4. In a device of the class described, means for securing a tread portion to the foot, said means comprising a member for affording rearward tension about the heel, spreaders on each side of the foot, and central, pivoted thrust links adapted to afford upward tension at the toe when the remote ends thereof are moved toward each other, in combination with means for causing such movement of said remote ends and tread comprising a toe portion extending downwardly and rearwardly at the toe and oppositely arranged rear portions extending downwardly and forwardly from the sides at points in the rear of maximum width of the hoof.

5. In a device of the class described, means for securing a tread portion to the foot, said means comprising a member for affording rearward tension about the heel, spreaders on each side of the foot, and central, pivoted thrust links adapted to afford upward tension at the toe when the remote ends thereof are moved toward each other, in combination with means for causing such movement of said remote ends and a flexible tread comprising flexible metallic strands and noncircular beads or rings strung upon said strands.

6. In a device of the class described, means for securing a tread portion to the foot, said means comprising a member for affording rearward tension about the heel, spreaders on each side of the foot, and central, pivoted thrust links adapted to afford upward tension at the toe when the remote ends thereof are moved toward each other, in combination with means for causing such movement of said remote ends and a flexible tread comprising flexible metallic strands and closely spaced rings strung upon said strands by perforations of slightly greater diameter than said strands.

7. In overshoes, a tread member and securing means extending about the heel and over the toe, provided with adjustable tightening means at the toe, in combination with a tread connection adjacent the toe, connected to said securing means on each side of the tightening means, the connections being constructed and arranged to permit tightening of said tightening means without loosening the tension of the tread connection at the toe.

8. In overshoes, a tread member and securing means extending about the heel and over the toe, provided with adjustable tightening means at the toe, in combination with a tread connection adjacent the toe, connected to said securing means on each side of the tightening means, the connections being constructed and arranged so that tightening of said tightening means increases upward tension on the tread connection at the toe.

9. In overshoes, securing means extending about the heel and over the toe, provided with adjustable tightening means at the toe, in combination with a tread portion having a toe strand and means for suspending the same at points on each side of the toe, said means being constructed and arranged to apply the tightening movement of said securing means as an upward movement on the toe strand suspending means.

10. In overshoes, a tread member and securing means extending about the heel and over the toe, provided with adjustable tightening means at the toe, in combination with a tread connection adjacent the toe, linked to said securing means on each side of the tightening means, the links being movably connected and arranged so that tightening of said tightening means increases upward tension on the tread connection at the toe.

11. In overshoes, a tread member and securing means extending about the heel and over the toe, provided with adjustable tightening means at the toe, a flexible tread connection adjacent the toe, linked to said securing means by points on each side of the toe by links operating to apply the tightening movement of said securing means as an upward movement on said tread connection and to prevent lateral displacement of the latter.

12. In overshoes, a tread member and securing means extending about the heel and over the toe, provided with adjustable tightening means at the toe, in combination with a flexible tread connection adjacent the toe linked to said securing means at points on each side of the toe by toggle links operating to apply the tightening movement of said securing means as an upward movement on said tread connection, together with downwardly converging toggle links operating to prevent lateral displacement of the latter.

13. In overshoes, a tread member and securing means extending about the heel and over the toe, provided with adjustable tightening means at the toe, in combination with a tread connection adjacent the toe, connected to said securing means on each side of the tightening means, the connecting means including downwardly converging toggle links.

14. In overshoes, a tread member and securing means extending about the heel and over the toe, provided with adjustable tightening means at the toe, in combination with a tread connection adjacent the toe, connected to said securing means on each side of the tightening means, the connecting means including upwardly converging toggle links.

Signed at New York city, in the county of New York and State of New York, this second day of February, A. D. 1909.

ALEXANDER G. UPTEGRAFF.

Witnesses:
GEORGE C. DEAN,
IRVING M. WRIGHT.

---

Copies of this patent may be obtained for five cents each, by addressing the "Commissioner of Patents. Washington, D. C."